United States Patent [19]

Yamanashi

[11] Patent Number: 5,021,975

[45] Date of Patent: Jun. 4, 1991

[54] PRINTER WITH IMPROVED IMAGE PRINTING FUNCTION

[75] Inventor: Masami Yamanashi, Shizuoka, Japan

[73] Assignee: Tokyo Electric Co., Ltd., Tokyo, Japan

[21] Appl. No.: 576,617

[22] Filed: Aug. 31, 1990

[30] Foreign Application Priority Data

Sep. 7, 1989 [JP] Japan .................................. 1-232406

[51] Int. Cl.⁵ .............................................. G06K 15/06
[52] U.S. Cl. ..................................... 364/519; 400/76
[58] Field of Search ............................... 364/518–520, 364/235 MS File, 900 MS File; 346/154; 400/67, 68, 76; 358/296

[56] References Cited

U.S. PATENT DOCUMENTS

| | | | |
|---|---|---|---|
| 4,826,333 | 5/1986 | Tanaka | 400/76 |
| 4,862,194 | 8/1989 | Uematsu | 346/76 PH |
| 4,941,180 | 7/1990 | Aoyagi et al. | 364/519 |

*Primary Examiner*—Arthur G. Evans
*Attorney, Agent, or Firm*—Frishauf, Holtz, Goodman & Woodward

[57] ABSTRACT

A printer includes a print data source for supplying print data, a print format setter for specifying a format to be issued, a print data preparer for defining the contents to be printed in accordance with the print data and the format, a print data memory for storing the print data of one sheet, a divider for dividing the print data stored in the print data memory into a plurality of areas, a print buffer having a freely and alternatively switchable drawing area in which data divided by the divider is drawn and printing area which contains pre-drawn divided data, a switcher for alternatively switching between the drawing and printing areas of the print buffer each time the drawing of the divided data is executed, and a printer block, coupled to the print buffer, for printing data of the printing area.

7 Claims, 7 Drawing Sheets

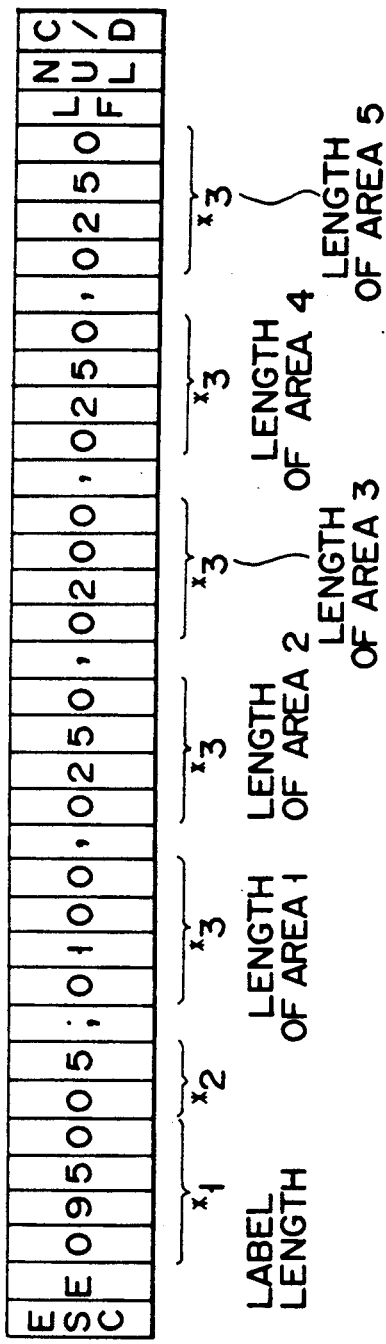
FIG. 5
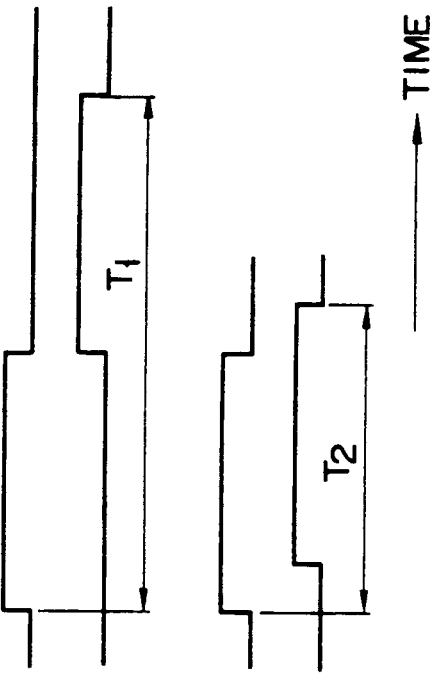
FIG. 7A
FIG. 7B

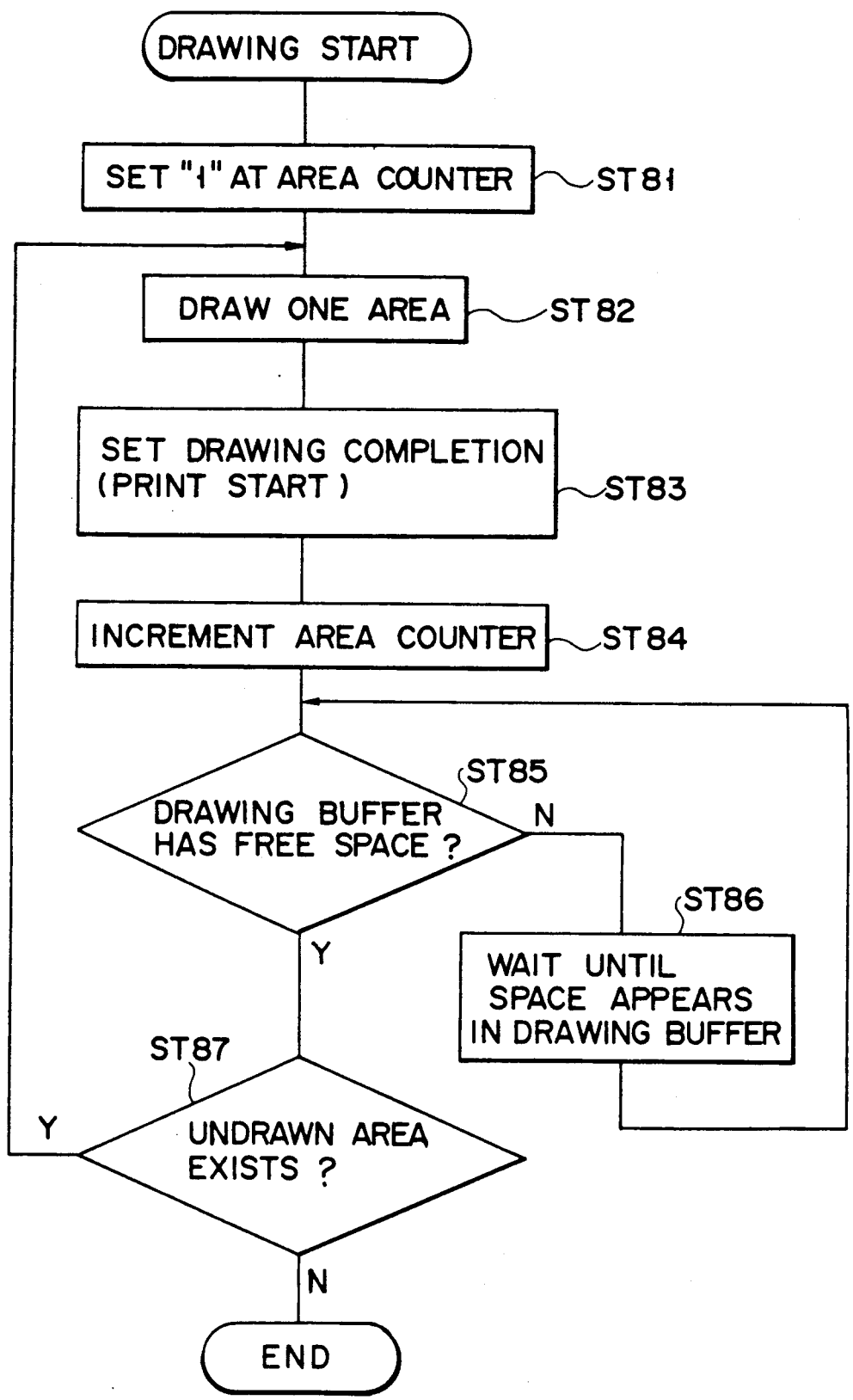
F I G. 8

PRINTER WITH IMPROVED IMAGE PRINTING FUNCTION

BACKGROUND OF THE INVENTION

1. Field of the Invention

The present invention relates to an improvement in a printer having a function for printing dot image data.

2. Description of the Related Art

In a conventional label printer, all contents of print data for one label to be printed are expanded (or drawn) in a memory (image buffer), and the label is then printed to issue. In other words, drawing for one print data and printing for the drawn print data are sequentially performed to issue one label.

According to the above conventional printer, the memory capacity must be as large as to hold the maximum size of all available labels, because all contents of a label to be issued must be expanded in the memory. Thus, the conventional printer requires a large memory capacity, or the maximum length (label size) of printable labels is limited by the active memory capacity.

Further, a conventional printer requires a long print time. That is, according to a conventional printer, printing is inhibited during the drawing operation in a memory and the printing can start only after completion of the drawing of print data for one label.

A prior art printer is shown in U.S. Pat. No. 4,862,194 patented on Aug. 29, 1989 to Uematsu. The printer of Uematsu can handle a large label whose one image size may overflow the limited capacity of an image buffer.

More specifically, according to Uematsu, a large label image is divided into several pieces, and each of the divided images are expanded or drawn into the image buffer for many times, thereby alternatively repeating the drawing and printing operations. Thus, the printer of Uematsu can print a big label having an image size larger than the actual memory size of the printer.

According to the printer of Uematsu, however, the speed of print processing decreases with increase in the number of division of the label image.

SUMMARY OF THE INVENTION

It is accordingly an object of the invention to provide a printer by which a memory capacity required to expand a prescribed amount of print data can be reduced and time required to print out a predetermined amount of print data can be shortened.

To achieve the above object, a printer of the present invention comprises a print data source (1) for supplying print data, a print format setter (2) for specifying an issue format, a print data preparer (3) for specifying print contents in accordance with the print data and the issue format, a print data memory (4) for storing the print data representing one print, a data divider (5) for dividing the print data stored in the print data memory (4) into a plurality of areas, a print buffer (6) including a drawing area for drawing the data divided by the divider (5) and a printing area for containing a predrawn divided data, a switcher (7) for alternatively switching between the drawing area and printing area of the print buffer (6) each time the drawing of the divided data is performed, and a printer block (8), coupled to the print buffer (6), for printing the data in the printing area.

The print data prepared by the print data preparer (3) from the print data source (1) and the print format setter (2) is divided by the divider (5). The divided data is drawn in the print buffer (6) while printing is performed according to already drawn divided data, thereby performing a simultaneous operation (parallel processing) of drawing and printing. A memory capacity required is at most double of the divided data (small data). Thus, a materially long label can be printed with a relatively small memory capacity.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 5 shows a memory map exemplifying an area setting command;

FIG. 7A shows a relation between drawing and printing performed in a conventional printer;

FIG. 7B shows a relation between drawing and printing performed in the printer of the invention;

FIG. 8 is a flow chart explaining the drawing process performed by the CPU in FIG. 2.

DETAILED DESCRIPTION OF THE PREFERRED EMBODIMENTS

A label printer according to an embodiment of the present invention will be explained with reference to the accompanying drawings.

Figure 2:
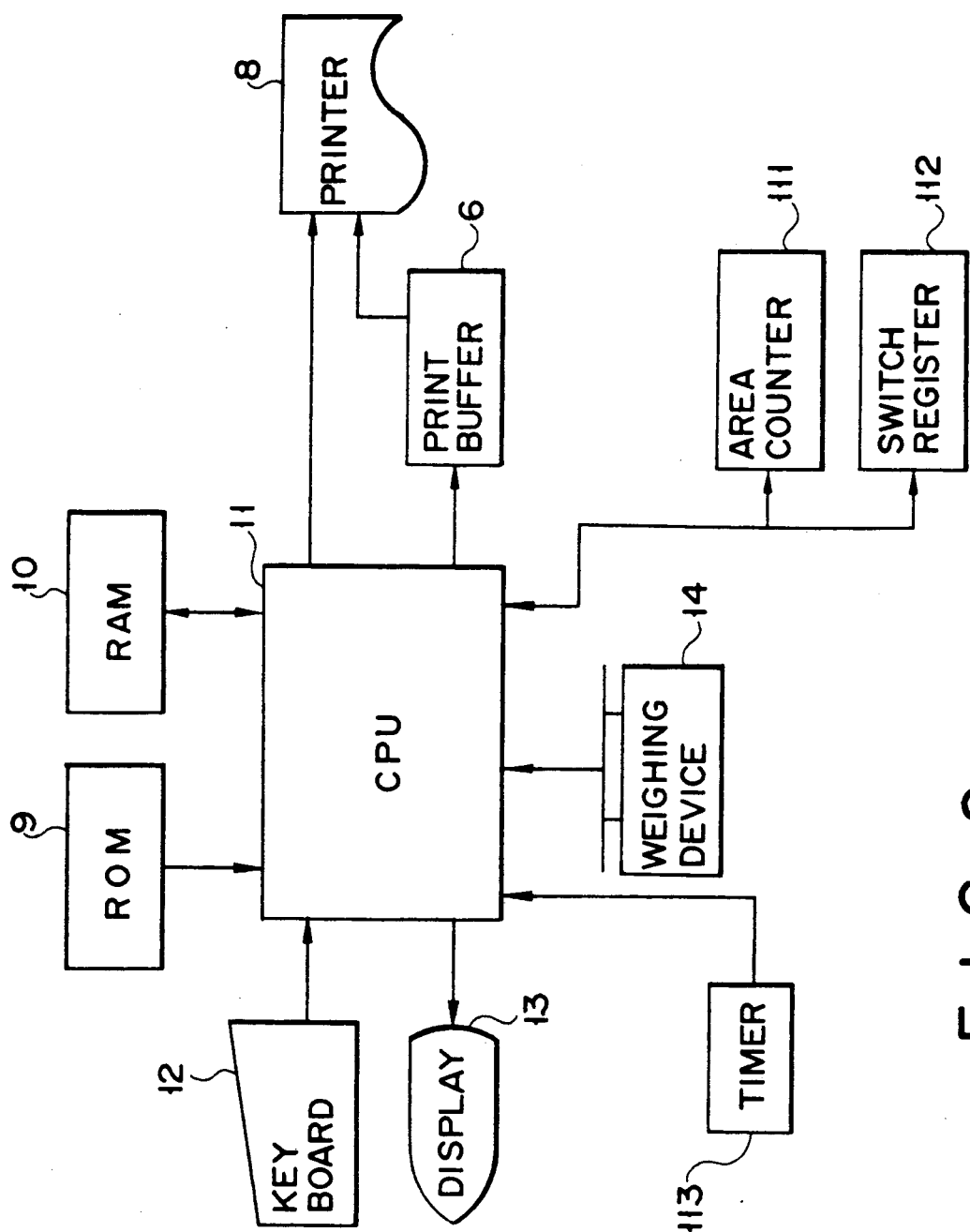
FIG. 2 is a block diagram showing a printer according to an embodiment of the invention.

A configuration of the label printer is shown in FIG. 2. In the figure, ROM 9 serving as a program storage and RAM 10 containing various memory blocks are coupled to CPU 11. Also coupled to CPU 11 are key input device (key board) 12, display 13, weighing device 14, print buffer 6, printer block 8, area counter 111, switch register 112, and timer 113.

Figure 3:
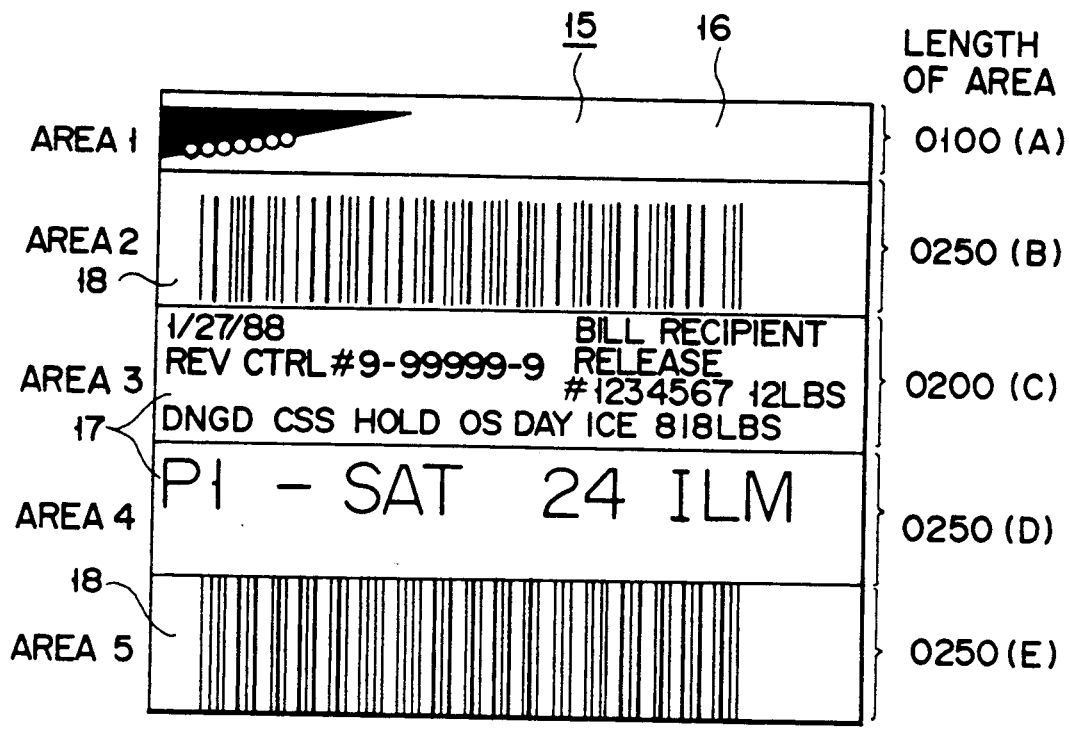
FIG. 3 is a plan view showing an example of a label to be printed.

Label 15 to be issued by the above label printer can be configured as shown in FIG. 3. Label 15 is formed of pre-printing portion 16, information printing portion 17, bar code printing portion 18, etc.

Figure 4:
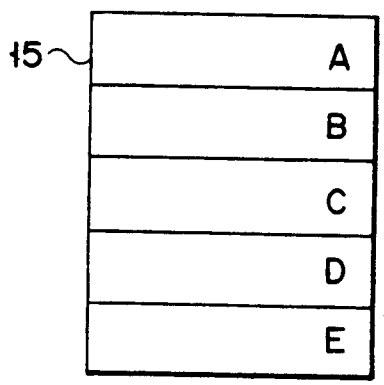
FIG. 4 illustrates the contents of print data in an abbreviate manner.

More specifically, as is shown in FIG. 3, it is divided into 5 areas. Area 1 is assigned as preprinting portion 16 having a content "A" and an area length "0100". Area 2 is assigned as bar code printing portion 18 having a content "B" and an area length "0250". Area 3 is assigned as information printing portion 17 having a content "C" and an area length "0200". Area 4 is assigned as information printing portion 17 having a content "D" and an area length "0250". Area 5 is assigned as bar code printing portion 18 having a content "E" and an area length "0250". FIG. 4 simply illustrates the above contents of label 15.

In the configuration as mentioned above, when label 15 is printed, a suitable format is set by format setter 2 in accordance with signals from print data source 1. For instance, when label 15 as shown in FIG. 3 is to be printed, the format shown in FIG. 5 is set. In FIG. 5, symbol *1 denotes an area of the total label length which in this case is 950 mm. Symbol *2 denotes an area of the number of areas which in this case is "5". Symbol *3 denotes the length of respective areas, where area 1 is 100 mm, area 2 is 250 mm, area 3 is 200 mm, area 4 is 250 mm, and area 5 is 250 mm. The data of FIG. 5 is stored in RAM 10 shown in FIG. 2.

The data to be printed is prepared by print data preparer 3, and the print data thus prepared is stored in print data memory 4. The print data from memory 4 is divided for respective areas by divider 5, and each of the divided data is supplied to print buffer 6. In print buffer 6, memory area 61 for drawing and memory area 62 for printing are alternatively switched by switcher 7. More specifically, immediately after a memory block in print buffer 6 has been used for drawing, such a block is then used for printing. (The function of switcher 7 can be obtained by a software of CPU 11 in FIG. 2).

Figure 6:
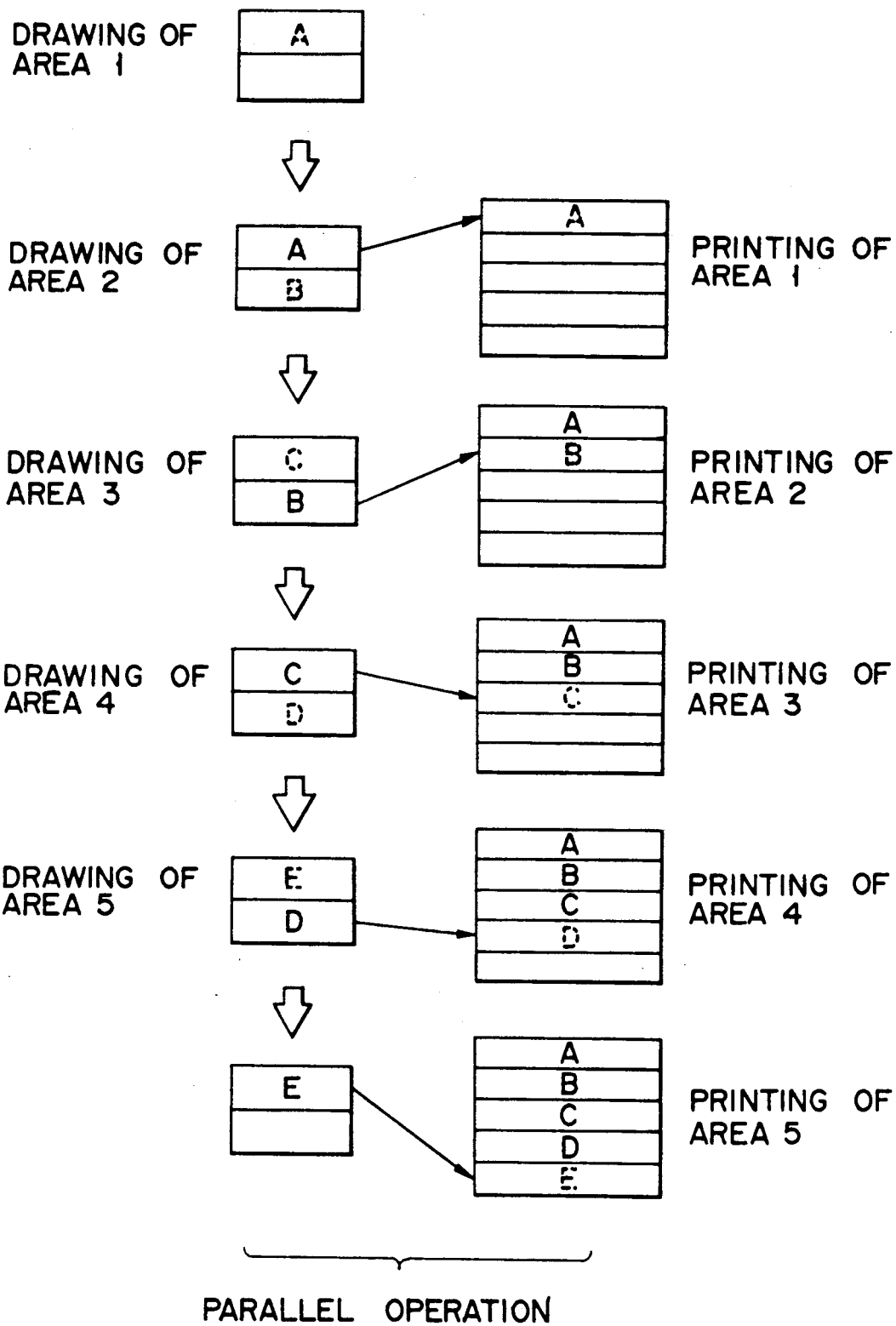
FIG. 6 illustrates printing process of the invention.

The embodiment of the invention will operated as follows. First, as shown in FIG. 6, the bit map image of print content "A" is expanded (or drawn) in drawing area 61 of print buffer 6. After completing the expansion, the memory area including content "A" is switched to printing area 62 by switcher 7, and the other memory area becomes drawing area 61 in which the bit image of print content "B" is subsequently expanded. It should be noted that the printing operation of print content "A" is performed in parallel to the drawing operation of print content "B".

Thereafter, print content "B" is printed out while print content "C" is drawn in buffer 6. In the same manner, printing of content "C" and drawing of content "D", and printing of content "D" and drawing of content "E" are sequentially performed. When the printing of last print content "E" is done, the print of one label 15 is completed.

Thus, the requirement for print buffer 6 is only that the memory capacity of buffer 6 is as large as to store two sets of divided data. Accordingly, even if the capacity of buffer 6 is not large, materially long size of label 15 can be printed out. Incidentally, in actual case, the number of divided data is set at amount 20 or less, and no infinite long label can practically be issued.

Meanwhile, there is also an improvement in the printing speed. According to a conventional art, a print operation starts after completing the drawing of all contents of one label, and total time T1 necessary for completing the print becomes long as is shown in FIG. 7A. In contrast, according to the printer of the invention, since most operating period of drawing overlaps that of printing (i.e., parallel operating period of drawing and printing is large), total time T2 for the print becomes short, and the time-saving effect of printing according to the present invention is prominent.

FIG. 8 is a flow chart explaining the drawing process performed by CPU 11 in FIG. 2.

Figure 1:
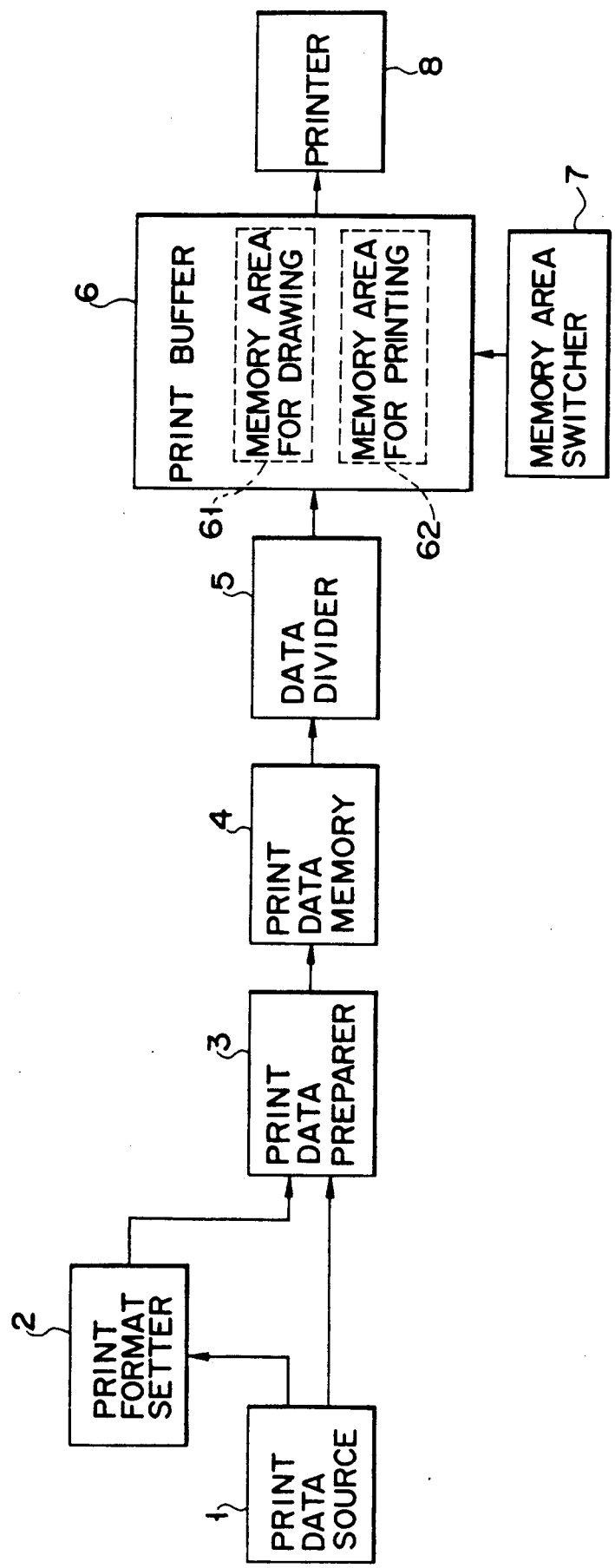
FIG. 1 is a block diagram showing a claimed configuration of a printer according to the present invention.

When the first area ("A" in FIG. 6) is to be drawn, CPU 11 sets area counter 111 at "1" (ST81). Then, CPU11 starts the drawing of divided print data (in this case the content of "A" in FIG. 6) which fits one drawing area (61) in print buffer 6 (ST82). When the drawing is completed, drawing completion flag "1" is set at switch register 112, and drawing area 61 is changed to printing area 62, so that the print of contents of printing area 62 starts (ST83). (Note that the function of switch register 112 corresponds to that of memory area switcher 7 in FIG. 1.)

After the print starts, the print sequence is interrupted for each one line printing in accordance with timer 113, so that print processing (which will be described later) is activated.

When the print has started, the content of area counter 111 is incremented by "1" (ST84). Thereafter, CPU 11 checks whether drawing area 61 in print buffer 6 has a free space (ST85). If no free space exists (ST85, no), CPU 11 waits for the completion of current printing process and printing area 62 in print buffer 6 is cleared (ST86).

When a free space becomes available in drawing area 61 of print buffer 6 (ST85, yes), CPU 11 checks whether undrawn area exists (ST87). This check can be done by comparing the content of area counter 111 with data *2 shown in FIG. 5. If there is an undrawn area, or when the content of counter 111 is less than data *2 (ST87, yes), the program sequence returns to step ST82. If no undrawn area exists, or when the content of counter 111 matches data *2 (ST87, no), the drawing process of FIG. 8 is finished.

Figure 9:
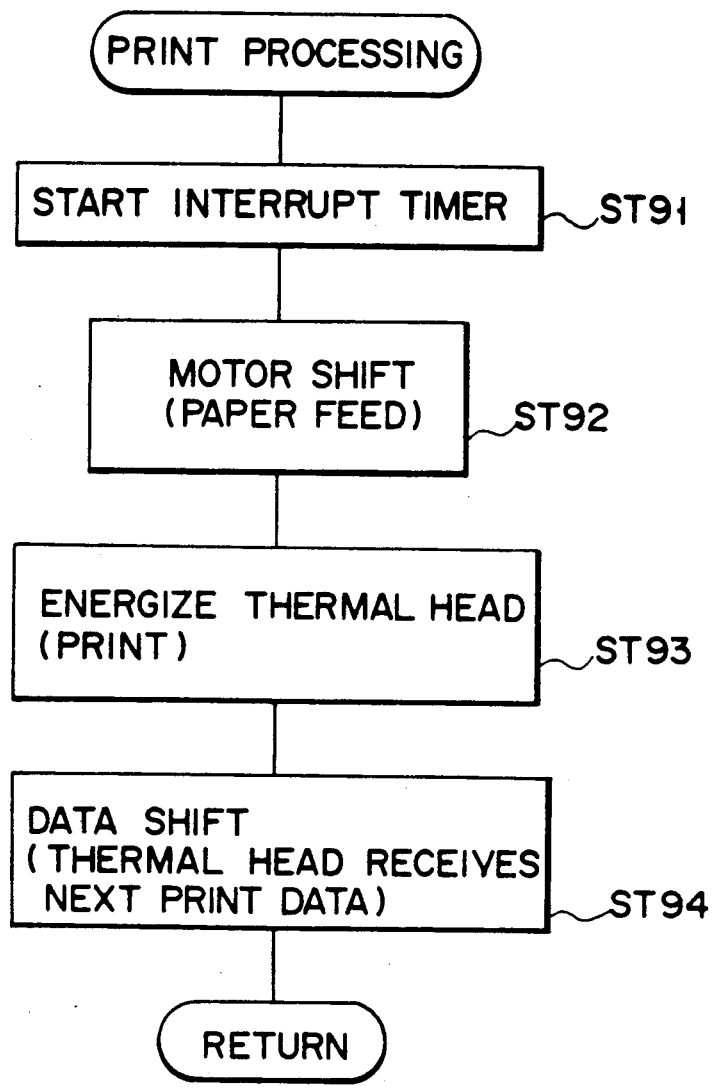
FIG. 9 is a flow chart explaining the printing process performed by the CPU in FIG. 2.

FIG. 9 is a flow chart explaining the printing process performed by CPU 11 in FIG. 2. When completion of drawing is set during the drawing process of FIG. 8, the printing process is executed one time. Thereafter, in response to the timer interruption by timer 113 of FIG. 2, the print processing routine of FIG. 9 is executed in parallel to the drawing process of FIG. 8.

More specifically, after the completion of drawing is set during the drawing process of FIG. 8, interruption timer 113 starts (ST91). Then, feeding of print paper (label) is performed by the motor shift of printer 8 (ST92). Immediately after activating the paper feeding, a thermal head (not shown) for printing is energized so that the label printing starts (ST93). The content of print data is renewed with the progress of printing (ST94), and the thermal head continues to print in accordance with the renewed data.

As has been mentioned above, according to the printer of the invention, print data prepared by the print data preparer from the print data source and the format setter is divided by the divider. The divided data is drawn in the print buffer, while pre-drawn divided data is printed during the drawing operation in the print buffer, so that a parallel operation of the drawing and the printing is performed, thereby shortening the time required to achieve the print. Further, since the print buffer may have a capacity of only a double of the divided data (i.e., a capacity for the drawing area and the printing area), the printable label length can be made relatively long without a restriction of the memory capacity, even if the memory capacity is small.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A printer apparatus comprising:
 means for providing print data;
 means for dividing said print data into a plurality of child data;

a print buffer having a first area and a second area, each of said first and second area having a memory capacity equal to or larger than one of said child data;

control means for expanding one of said child data to said first area, assigning said first area as a printing area and said second area as a drawing area after completing the expansion of said one child data, and expanding another one of said child data to said drawing area while the print data of said child data is output from said printing area; and means for printing the print data output from said printing area on a given print media.

2. A printer apparatus according to claim 1, wherein when one of said child data is printed, said control means has a function for assigning said second area as said drawing area while said first area is assigned as said printing area; and when subsequent one of said child data is printed, said control means has a function for assigning said first area as said drawing area while said second area is assigned as said printing area.

3. A printer apparatus according to claim 1, wherein said print data providing means includes:

means for generating original print data;

means for generating print format data; and means for combining said original print data with said print format data to provide said print data.

4. A printer apparatus according to claim 3, wherein said given print media includes a label, and said format data includes:

data indicating a total length of said label;

data indicating the number of said child data; and data indicating a label length of each said child data.

5. A printer apparatus according to claim 3, wherein said print data includes a bar code relating to contents to be printed.

6. A printer apparatus according to claim 1, wherein said dividing means includes:

means for storing said print data; and means for dividing the print data stored in said storing means by the number of said child data.

7. A printer comprising:

print data source means for supplying print data;

format setter means for specifying a format to be issued;

print data preparer means for defining contents of a print in accordance with the print data and the format;

print data memory means for storing the print data of one sheet;

divider means for dividing the print data stored in said print data memory means into a plurality of areas;

a print buffer including a drawing area in which data divided by said divider means is drawn and a printing area in which pre-drawn divided data is contained;

switch means for alternatively switching between the drawing and printing areas of said print buffer each time the drawing of said divided data is executed; and means, coupled to said print buffer, for printing data in said printing area.

* * * * *